Aug. 5, 1924. 1,504,057
C. W. A. KOELKEBECK
SAILING VESSEL
Filed Aug. 1, 1922 6 Sheets-Sheet 1
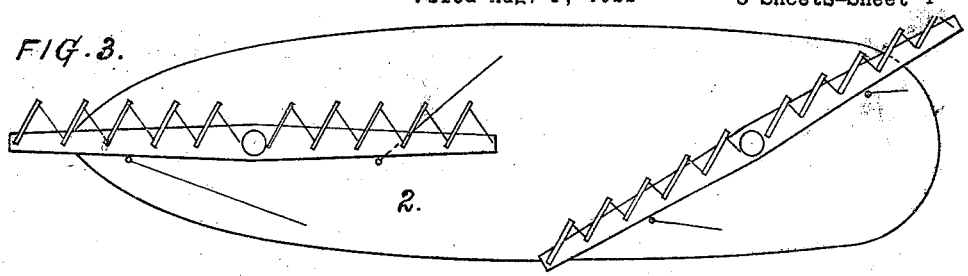
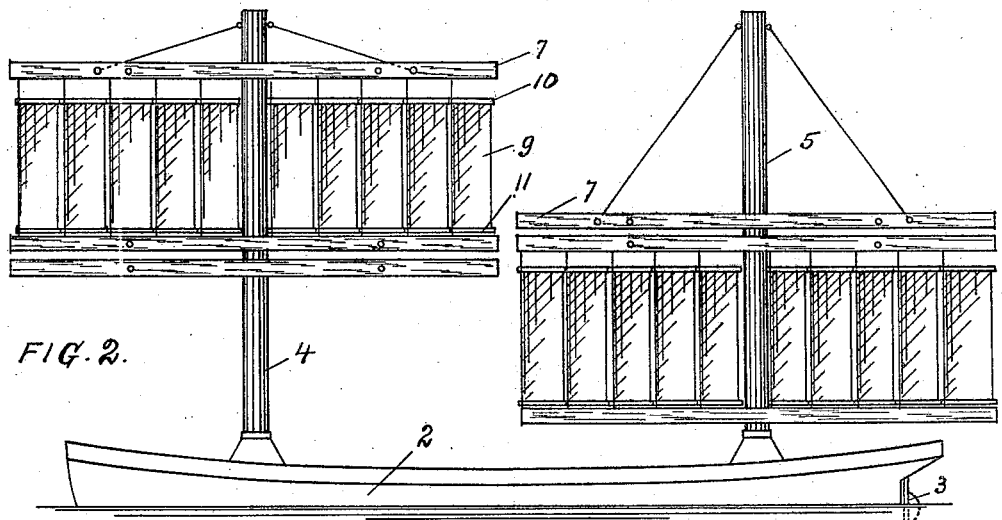
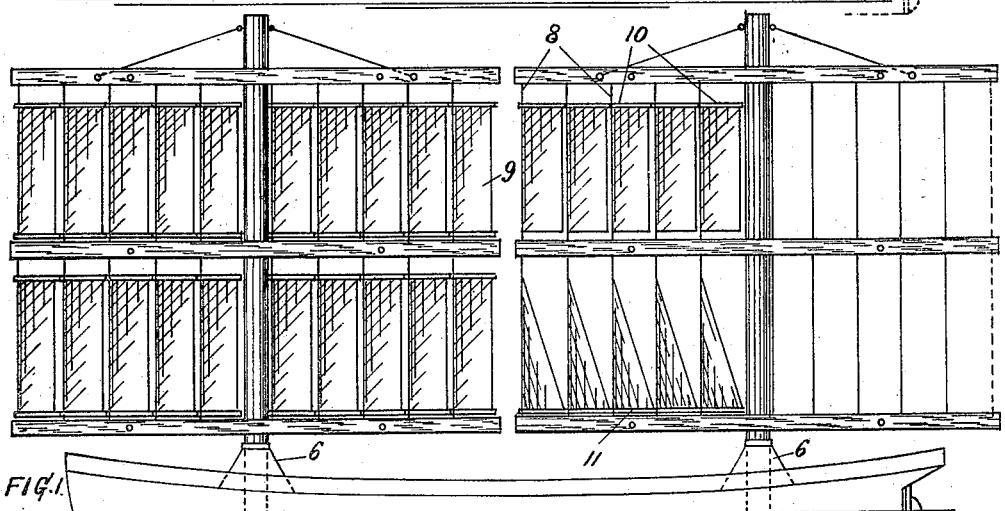
INVENTOR:
Carl W. A. Koelkebeck,
BY
his ATTORNEYS.

Aug. 5, 1924.
C. W. A. KOELKEBECK
1,504,057
SAILING VESSEL
Filed Aug. 1, 1922    6 Sheets-Sheet 2
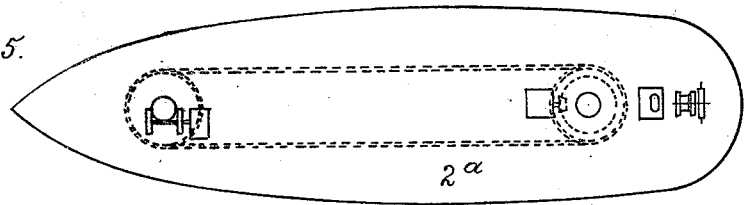
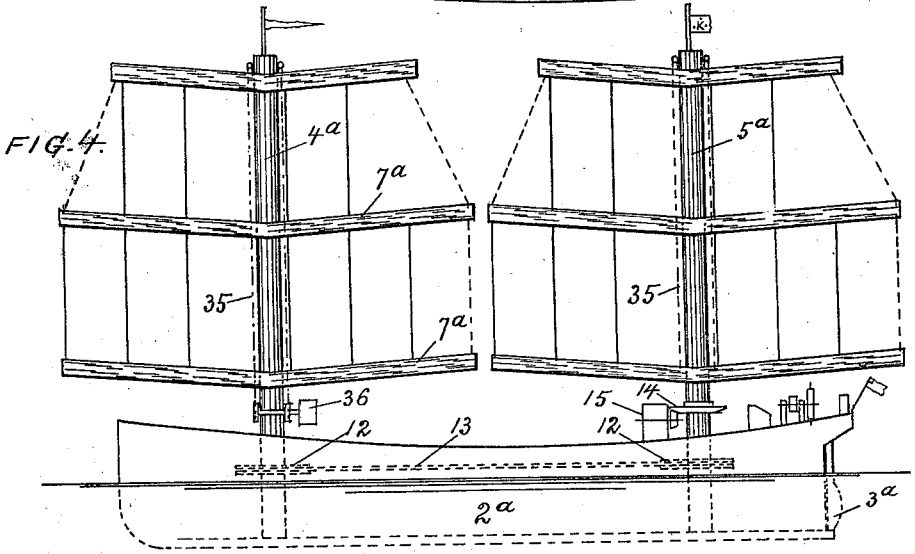
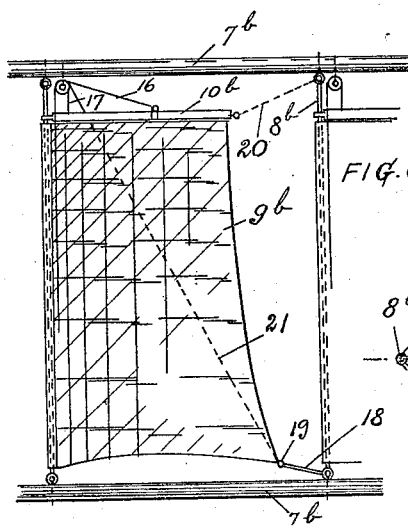
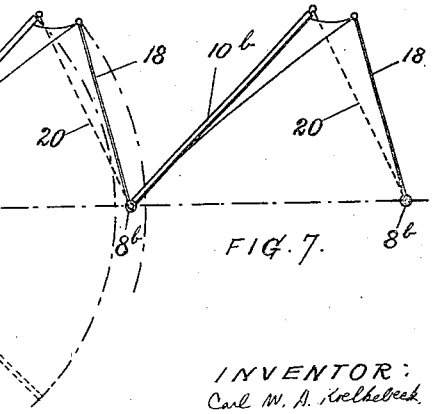

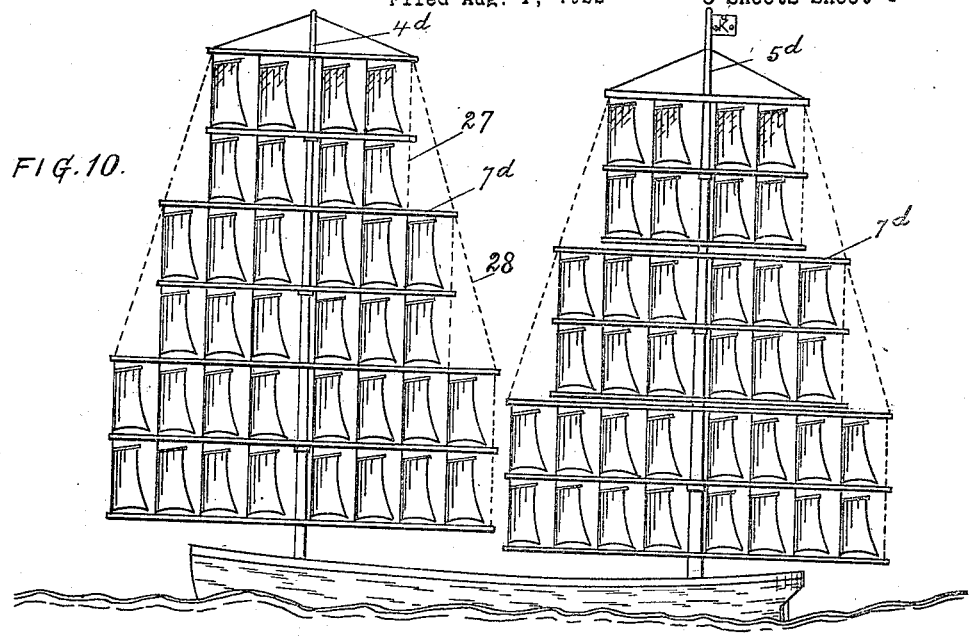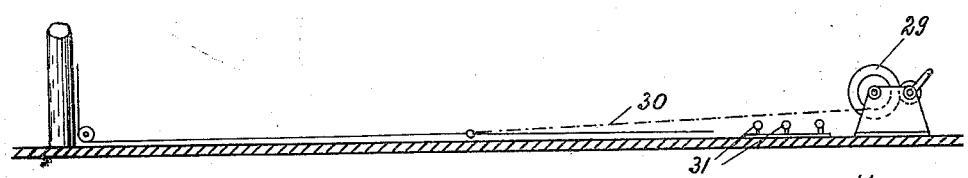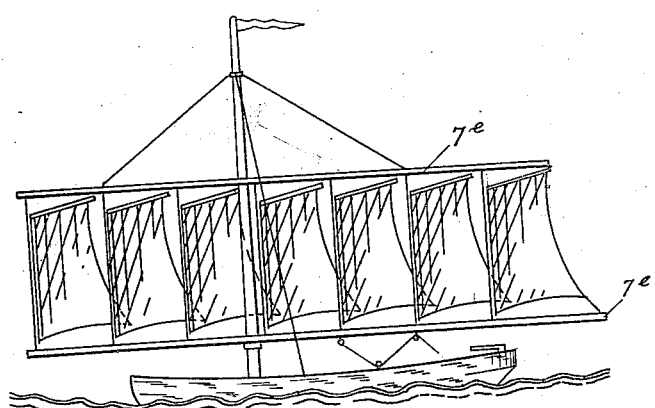

Aug. 5, 1924.  1,504,057

C. W. A. KOELKEBECK
SAILING VESSEL
Filed Aug. 1, 1922  6 Sheets-Sheet 5

INVENTOR:
Carl W. A. Koelkebeck.
BY
ATTORNEYS

Aug. 5, 1924.

C. W. A. KOELKEBECK 1,504,057

SAILING VESSEL

Filed Aug. 1, 1922     6 Sheets-Sheet 6

INVENTOR:
Carl W. A. Koelkebeck,
BY
ATTORNEYS.

Patented Aug. 5, 1924.

1,504,057

UNITED STATES PATENT OFFICE.

CARL W. A. KOELKEBECK, OF PITTSBURGH, PENNSYLVANIA.

SAILING VESSEL.

Application filed August 1, 1922. Serial No. 578,944.

*To all whom it may concern:*

Be it known that I, CARL W. A. KOELKEBECK, a citizen of the United States, residing at Pittsburgh, in the county of Allegheny and State of Pennsylvania, have invented a new and useful Improvement in Sailing Vessels, of which the following is a full, clear, and exact description.

The present invention relates broadly to sailing vessels and more particularly to improvements in the sails and rigging of such vessels.

At the present time, due to the difficulty of handling and repairing sails, the sailing vessel is falling rapidly into disuse.

By the present invention there is provided an improved type of vessel operating economically, efficiently and scientifically.

These advantages in the operation are secured irrespective of the size or use of the vessel, by a new arrangement and construction of sails, there being improvements both in the standing and running rigging to enable these results to be accomplished.

In the accompanying drawings there is shown for purposes of illustration only, certain forms of my invention, it being understood that the drawings do not define the limits of my invention and that changes may be made in the construction and operation disclosed herein without departing from the spirit of the invention or scope of my broader claims.

In the drawings,—

Figure 1 is a side elevation illustrating diagrammatically one form of vessel constructed in accordance with the present invention;

Figure 2 is a view corresponding to Figure 1, illustrating the sails in different positions;

Figure 3 is a top plan view of the construction illustrated in Figure 1, the yards on the mizzenmast extending at an angle with respect to the longitudinal axis of the vessel and the sails on the foremast extending at an angle with respect to the yards;

Figure 4 is a side elevation of a modified form of vessel;

Figure 5 is a diagrammatic top plan view of a portion of the construction illustrated in Figure 4;

Figures 6 and 7 are detail views illustrating one form of sail which may be used with the present invention;

Figure 10 is a side view illustrating another embodiment of the invention;

Figure 11 is a detail view illustrating a portion of the operating mechanism;

Figure 12 is a side elevation illustrating a construction particularly adapted for small vessels;

Figure 8:
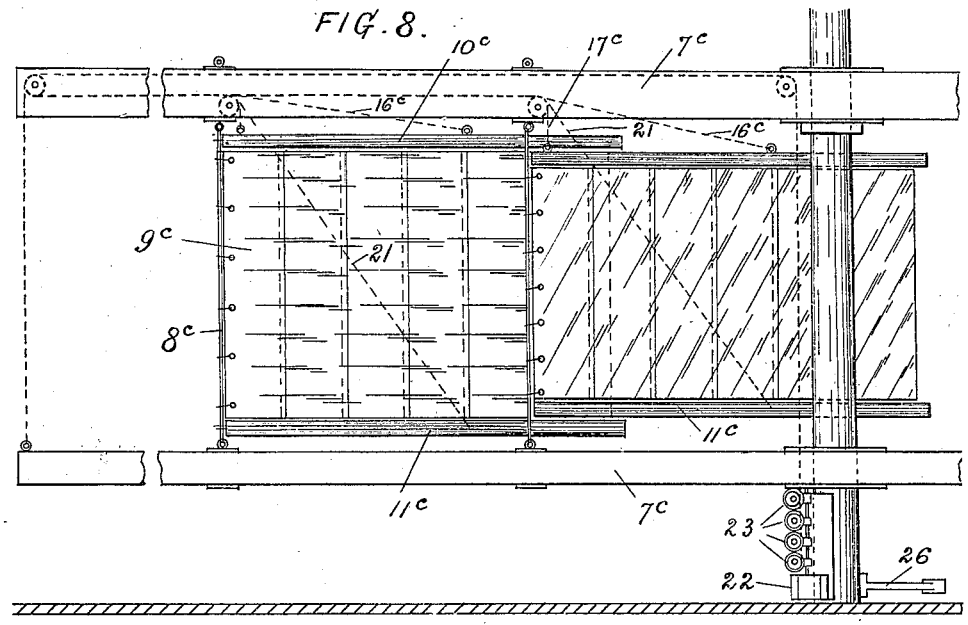
Figures 8 and 9 are detail views illustrating a different form of sail.

In carrying out the present invention, it will be apparent that I may utilize an old hull changing the location of the masts if necessary, or that I may construct an entirely new hull. It will also be obvious that the size and shape of the hull or the use to which the vessel is placed is immaterial.

Referring more particularly to Figures 1, 2 and 3 of the drawings, there is illustrated a sailing vessel having a hull 2 and provided with the usual rudder 3.

Extending upwardly from the hull may be a foremast 4 and mizzenmast 5. While these masts may be of any usual construction, I preferably employ hollow metallic structures mounted for rotation about their longitudinal axes, but held against any lateral movement. This may be accomplished by holding the foot of the mast in a step-bearing (not shown) near the bilge and providing a hollow bearing 6 on the upper deck as shown. With this construction the masts are strong enough to withstand all wind loads without providing stays, braces or shrouds.

Carried by each of the masts is a plurality of yards 7. These yards preferably extend radially of the masts as shown, whereby they may rotate in unison with the masts, or independently thereof, to any desired position or angularity with respect to the hull.

In the form of the invention illustrated in these figures the yards are arranged in sets of three. With such arrangement the middle yard is preferably stationarily mounted with respect to vertical movement on its respective mast, while either the lower yard may be mounted to move upwardly, the upper yard to move downwardly, or both. This facilitates reefing the sails or readily controlling the spread of canvas, as will be apparent hereinafter.

Extending vertically between the yards are a series of luff lines 8, each having operatively secured thereto the luff of a sail 9. The sails 9 may be generally of rectangular shape, or of triangular shape as illustrated between the middle and lower yards of the mizzenmast in Figure 1. Also, each of the sails may have both a gaff 10 and a boom 11, as illustrated in certain of these figures, a gaff only as illustrated in other of the views, or a boom only when the sails are of triangular shape. Preferably all of the sails on the same vessel will be of the same shape, whereby repair is facilitated, although this arrangement is not essential.

It is well recognized at the present time that in beating to the windward the major portion of the work is done by the luff of the sail. During such operation, therefore, the length of the cutting edge or luff of the sail is much more important than the width of the sail. By the present invention, there is provided a construction of maximum efficiency in this respect. Each of the sails may individually be of comparatively slight width but the cumulative advantage of all of the cutting edges or luff edges will be obtained.

It has been found by long experience that desirable results may be obtained from sailing vessels where the tangent of the angle between the wind and the sail is twice as great as the tangent of the angle between the sail and the course of the vessel. By the present invention the desired angularity may be easily accomplished by changing the angularity of the respective sails with relation to the yards, as shown in Figure 3, on the foremast, or by changing the angularity of the yards, or both.

In Figures 4 and 5 the hull 2$^a$ of the vessel is illustrated as provided with a foremast 4$^a$ and a mizzenmast 5$^a$. These masts are each illustrated as being rotatably mounted, carrying adjacent their lower ends gears or pulleys 12 around which passes a sprocket chain or cable 13 whereby the masts may be rotated in unison. This rotation may be accomplished by providing on one of the masts, for example, the mizzenmast, a bevel gear 14 adapted to be driven by a motor 15. In the construction illustrated in this form of the invention the yards 7$^a$ are illustrated as inclined upwardly on opposite sides of the masts. This construction may be desirable in some instances in order to prevent dipping of the ends of the yards in the water.

In Figures 6 and 7 there is illustrated in detail one form of sail which may be used with the forms of the invention heretofore described. In this construction, there is shown a portion of adjacent yards 7$^b$ having extending therebetween series of luff lines 8$^b$. To each of these luff lines is secured the luff of a sail 9$^b$. Each of these sails may be provided with a gaff 10$^b$ adapted to be operated by the peak halyard 16 and the throat halyard 17. The sail illustrated is of the well known fore-and-aft type and has a lower sheet 18 secured to the clew 19 and an upper sheet 20 which may be secured to the gaff for bringing the leech of the sail into the wind. The broad idea of providing means for bringing the leech into the desired position is made the subject matter of my co-pending application Serial No. 449,434, filed March 3, 1921. It will be understood that the dimensions of the individual sails are such that they may readily swing through the panels provided therefor between adjacent yards and luff lines as may be required for jibbing or tacking. The movement of the parts during this operation is illustrated clearly in Figure 7.

In some instances it may be desirable to crowd on more canvas than is possible with the construction illustrated in Figures 6 and 7. If such is the case, the sails may be constructed in the manner illustrated more particularly in Figures 8 and 9. In this construction there is shown a portion of a mast which carries yards 7$^c$. Between these yards extend luff lines 8$^c$, as before described. To each luff line is secured the luff of a sail 9$^c$ having both a gaff 10$^c$ and a boom 11$^c$. It will be noted that the length of the booms and gaffs is greater than the width of the panel provided between adjacent luff lines. This makes it impossible for the sails to swing freely between the yards as required in tacking and in order to permit the necessary movement of the sails the booms 11$^c$ may be swung into upwardly inclined position, as illustrated in Figure 9, by hauling on the topping lifts 21, and the gaffs may be lowered into inclined position as shown in Figure 9 by loosing the peak halyards 16$^c$. For effecting movement simultaneously of all of the sails, it will be understood that all of the topping lifts may be connected for simultaneous operation, the same being true of the peak halyards 16$^c$ and the throat halyards 17$^c$. This operation may be either effected manually or may be accomplished by providing a suitable motor 22 driving a series of drums 23 to each of which drums passes a separate set of the members to be operated.

In Figure 9 the motor 22 is illustrated as replaced by hydraulic cylinder 24 which is adapted to actuate the cable 25 for raising and lowering the lower yard 7ᶜ. Rotation of the masts into the desired position with this form of the invention may be effected manually by suitable levers 26.

Figure 9:
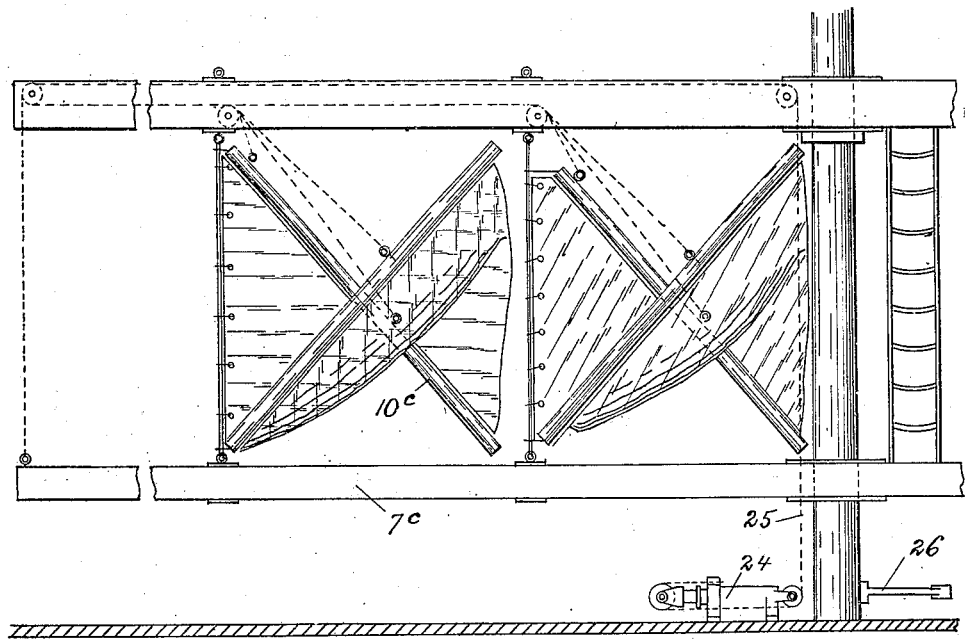
Figure 13:
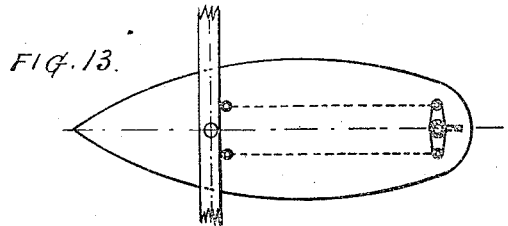
Figures 13, 14, 15 and 16 are views illustrating a construction which may be utilized with model vessels.

In Figure 8 sails are shown as being of different dimensions, whereby the gaffs and booms of adjacent sails do not interfere. This construction, however, may be changed as desired.

In Figure 10 there is illustrated a construction in which the foremast 4ᵈ is higher than the mizzenmast 5ᵈ, whereby in running before the wind the sails carried by the mizzenmast do not block off the passage of wind to the sails carried by the foremast. The yards 7ᵈ may be braced in any desired manner, as by providing vertically extending braces 27 and inclined braces 28. The yards on the mizzenmast are illustrated as being arranged in sets of three, while in the arrangement shown on the foremast the top yard of each set of three serves as the lower yard for the next set thereabove.

In Figure 11 there is illustrated diagrammatically a convenient method of effecting adjustments as may be required. This arrangement may comprise a suitable windlass 29 adapted to operate a chain or cable 30 which may be secured to any rope, cable, sheet or the like to be drawn in, after which the same may be belayed to suitable cleats 31.

In Figure 12 there is shown an arrangement particularly adapted for small vessels in which it is desired to crowd on as much canvas as possible and still keep the same close to the deck in order to minimize the danger of overturning. The yards 7ᵉ in this figure are illustrated as being of unequal lengths fore-and-aft, respectively, of the mast, but this arrangement is not necessary. The yards may be symmetrically disposed on opposite sides of the mast if desired in order to balance the wind pressure when running before the wind. On the other hand this same condition may be secured by reefing one of the sails between the yards to balance the wind pressure when running before the wind.

Figure 14:
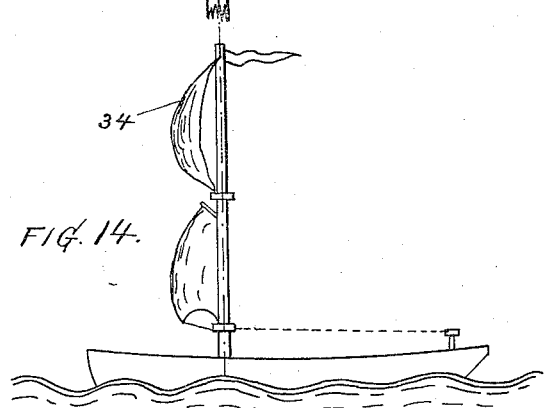
Figure 15:
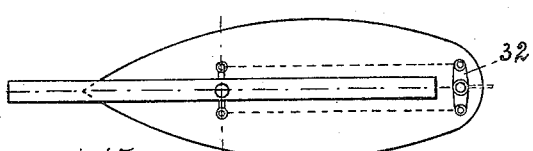
Figure 16:
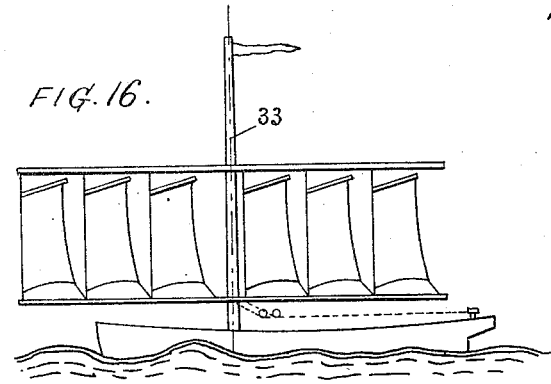

In Figures 13 to 16 there is illustrated a construction which may be utilized for small or model vessels. In this construction the helm 32 may be operatively connected in any desired manner to the rotatable mast 33, whereby rotation of the mast due to changes in the direction of the wind will effect a counteracting movement of the rudder. In Figure 14 the vessel is shown as provided with a spinnaker 34 which may or may not be utilized as desired.

Figures 17, 18:
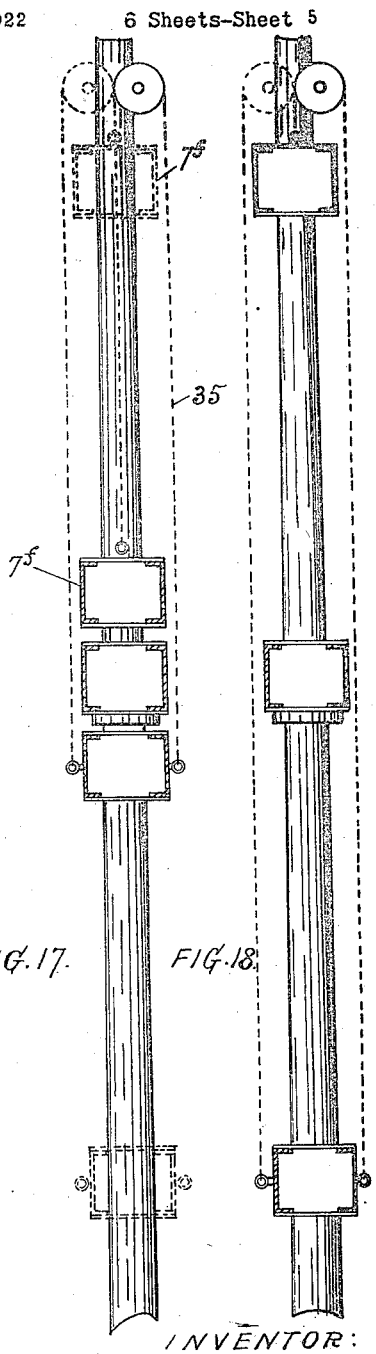
Figures 17 and 18 are detail views illustrating one form of yard construction and mounting.

In Figures 17 and 18 there is shown a convenient method of mounting the yards 7ᶠ when they are arranged in sets of three. In this embodiment of the invention the middle yard is stationary while the weight of the lower yard is counterbalanced by the weight of the upper yard by means of cables 35. This minimizes the amount of work required for reefing sails thereby enabling this operation to be accomplished more expeditiously. In Figure 4 this same counterbalancing arrangement employing the cables 35 is illustrated, the cables being adapted to be operated either manually or by a suitable motor 36.

Figure 19:
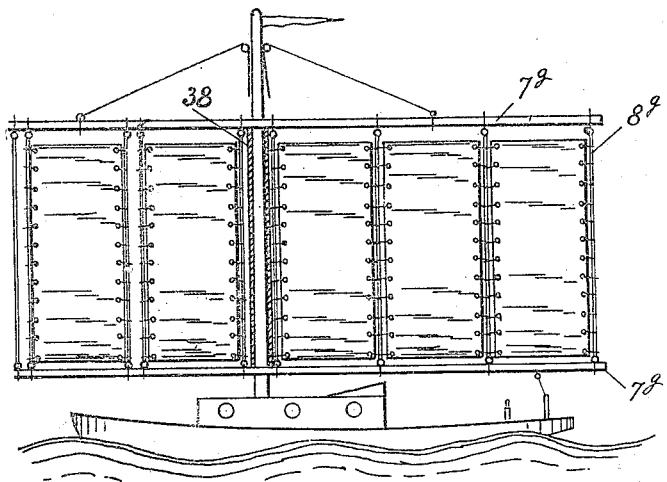
Figure 19 is a side elevation illustrating a construction particularly adapted for life boats.

In Figure 19 I have shown a construction in accordance with the present invention particularly adapted for life boats and the like, with which it may be desirable at times to run either ahead or astern. In this arrangement the yards 7ᵍ have extending therebetween a series of lines 8ᵍ. Each of these lines, with the exception of the first and last on each side of the mast is adapted to have secured thereto the luff of one sail and the leech of another sail. In this manner the sails are positively held in the desired position whereby the vessel may be conveniently propelled in either direction. The yards may be connected to rotate in unison by providing a sleeve 38 surrounding the mast and secured at its opposite ends to the yards.

Figure 20:
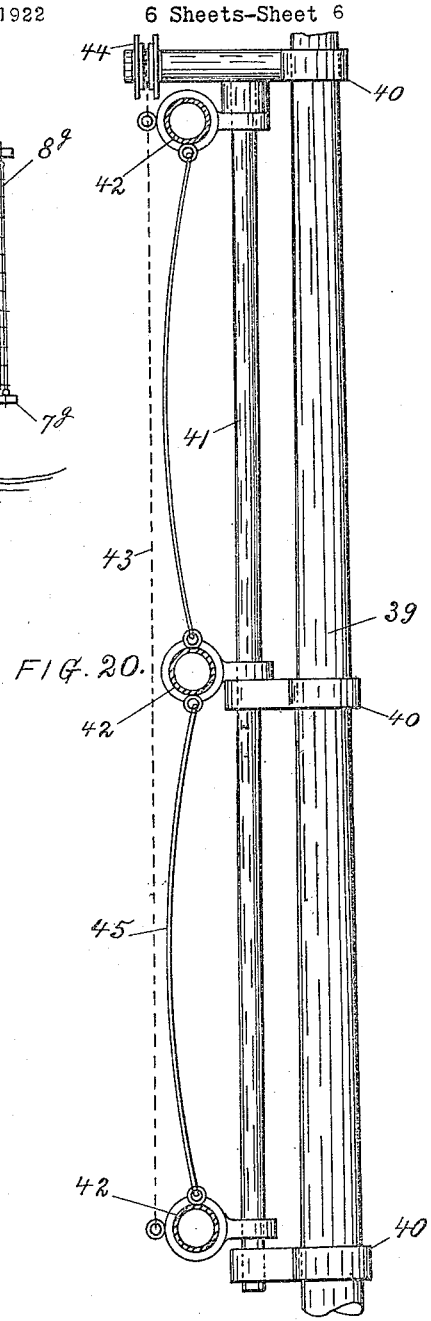
Figure 20 is a detail sectional view illustrating one method of mounting the yards.

In the detail construction shown in Figure 20 there is illustrated a mast 39 having bands 40 secured thereto in the desired spaced relationship and supporting a pole mast 41. To this pole mast are secured the yards 42, the middle yard resting on the middle band 40. The weight of the lower yard is counterbalanced by the upper yard by a connecting cable 43 passing over the cable sheave 44 and thence downwardly to the upper yard. The sails 45 in this figure are shown as curved outwardly to represent the position they assume with wind pressure from the right as viewed in this figure.

With any of the forms of this invention it will be apparent that a centralized control may be provided, as for example in the pulpit whereby all of the operations may be expeditiously performed. This is particularly true where electric motors are provided for securing the desired results, as the controlling switches for each of the motor circuits may be mounted in the pulpit.

Certain advantages of the present invention arise from the provision of a plurality of comparatively small sails which may be easily and quickly handled, which increases the effectiveness thereof and which decreases the operating cost.

I claim:

1. In a sailing vessel, a hull, a mast secured thereto, yards carried by said mast, luff lines extending between said yards, sails each having its luff edge secured to one of said luff lines, and means for bringing the luff edges into the wind irrespective of its direction without changing the course of the vessel.

2. In a sailing vessel, a hull, a mast secured thereto for rotation about its longitudinal axis, yards carried by said mast, luff lines connecting said yards, and sails each having its luff edge secured to one of said luff lines.

3. In a sailing vessel, a hull, a mast carried thereby, yards operatively secured to said mast, and a fore-and-aft sail operatively secured between said yards.

4. In a sailing vessel, a hull, a mast carried thereby, yards operatively secured to said mast, and a plurality of fore-and-aft sails operatively secured in position between said yards.

5. In a sailing vessel, a hull, a mast carried thereby, yards operatively secured to said mast, and a plurality of overlapping fore-and-aft sails operatively secured in position between said yards, said sails each being secured to luff lines extending between and connecting adjacent yards.

6. In a sailing vessel, a hull, a mast carried thereby, angularly adjustable yards operatively secured to said mast, a luff line extending between said yards, a sail having its luff edge secured to said luff line, and a sheet connected to the clew of said sail.

7. In a sailing vessel, a hull, a mast, yards operatively secured to said mast, a luff line connecting said yards, a leech line connecting said yards, and a sail having its luff and leech edges, respectively, secured to said luff line and said leech line.

8. In a sailing vessel, a hull, a mast, a pole mast carried thereby, three yards operatively carried by said pole mast in superimposed relationship, and means for causing the upper and lower yard to move in unison.

9. In a sailing vessel, a hull, a mast, a pole mast carried thereby, yards operatively carried by said pole mast and rotatable relatively to said hull, a rudder, a helm, and means for operating the helm upon changes in the angularity of said yard.

10. In a sailing vessel, a hull, a mast secured thereto, yards carried by said mast, luff lines extending between said yards, sails having their luff edges secured to said luff lines, all of said sails being of the same shape and dimensions, and means for changing the angular relationship between said yards and the longitudinal axis of the vessel.

11. In a sailing vessel, a hull, a mast secured thereto, yards carried by said mast, luff lines extending between said yards, a gaff carried by each of said luff lines, a plurality of sails each having the luff edge secured to a luff line and cooperating with said gaffs, and means for changing the angular relationship between said yards and the longitudinal axis of the vessel.

12. In a sailing vessel, a hull, a mast secured thereto, yards carried by said mast, luff lines extending between said yards, a gaff carried by each of said luff lines, a plurality of sails each having the luff edge secured to a luff line and cooperating with said gaffs, said gaffs extending parallel to said yards, and means for changing the angular relationship between said yards and the longitudinal axis of the vessel.

13. In a sailing vessel, a hull, a mast secured thereto, yards carried by said mast, luff lines extending between said yards, booms cooperating with said luff lines, fore-and-aft sails secured to said luff lines and said booms, and means for changing the angular relationship between said yards and the longitudinal axis of the vessel.

14. In a sailing vessel, a hull, a mast secured thereto, yards carried by said mast, luff lines extending between said yards, booms cooperating with said luff lines, fore-and-aft sails secured to said luff lines and said booms, said booms being parallel to said yards, and means for changing the angular relationship betwen said yards and the longitudinal axis of the vessel.

In testimony whereof I have hereunto set my hand.

CARL W. A. KOELKEBECK.